US009473302B2

(12) United States Patent
Yasuda et al.

(10) Patent No.: US 9,473,302 B2
(45) Date of Patent: Oct. 18, 2016

(54) CIPHERTEXT PROCESSING DEVICE, CIPHERTEXT PROCESSING METHOD, COMPUTER-READABLE RECORDING MEDIUM, AND INFORMATION PROCESSING DEVICE

(71) Applicant: FUJITSU LIMITED, Kawasaki-shi, Kanagawa (JP)

(72) Inventors: Masaya Yasuda, Kawasaki (JP); Takeshi Shimoyama, Shinagawa (JP); Jun Kogure, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 0 days.

(21) Appl. No.: 14/634,931

(22) Filed: Mar. 2, 2015

(65) Prior Publication Data

US 2015/0280914 A1    Oct. 1, 2015

(30) Foreign Application Priority Data

Mar. 25, 2014   (JP) .................................. 2014-062743

(51) Int. Cl.
*H04L 9/30* (2006.01)
*H04L 9/00* (2006.01)
*H04L 9/14* (2006.01)

(52) U.S. Cl.
CPC ............. *H04L 9/3093* (2013.01); *H04L 9/008* (2013.01); *H04L 9/14* (2013.01); *H04L 2209/24* (2013.01)

(58) Field of Classification Search
None
See application file for complete search history.

(56) References Cited

U.S. PATENT DOCUMENTS

| 8,515,058 B1* | 8/2013 | Gentry | .................... | H04L 9/008 380/28 |
| 2010/0063986 A1* | 3/2010 | Yonemura | ............... | G06F 17/10 708/492 |
| 2012/0039463 A1* | 2/2012 | Gentry | .................... | H04L 9/008 380/28 |

FOREIGN PATENT DOCUMENTS

| JP | 2000-181486 A | 6/2000 |
| JP | 2009-271584 A | 11/2009 |

OTHER PUBLICATIONS

Craig Gentry,"Fully Homomorphic Encryption Using Ideal Lattices",STOC 2009,ACM,pp. 169-178, 2009(10 pages).
Kristin Lauter et al.,"Can Homomorphic Encryption be Practical?",in ACM workshop on Cloud Computing Security Workshop-CCSW 2011, ACM,pp. 113-124, 2011 (11 pages).
European Extended Search Report dated Sep. 16, 2015 for corresponding European Patent Application No. 15156575.1, 8 pages.

(Continued)

*Primary Examiner* — Brandon Hoffman
(74) *Attorney, Agent, or Firm* — Fujitsu Patent Center

(57) ABSTRACT

A ciphertext processing device acquires a first polynomial into which first text data is converted with a first order and which is encrypted with a first public key and a first square-value polynomial into which square-value vector data of each component of the first text data is converted with the first order and which is encrypted with the first public key. The ciphertext processing device acquires a second polynomial into which second text data is converted with a second order and which is encrypted with the first public key and a second square-value polynomial into which square-value vector data of each component of the second text data is converted with the second order and which is encrypted with the first public key. The ciphertext processing device determines whether the second text data is included in the first text data, using the each polynomial.

6 Claims, 4 Drawing Sheets

(56) References Cited

OTHER PUBLICATIONS

Yasuda, Masaya et al., "Secure Pattern Matching using Somewhat Homomorphic Encryption," Cloud Computing Security Workshop, ACM, 2 Penn Plaza, Suite 701, New York, NY 10121-0701, Nov. 3, 2013, pp. 65-76, XP058034246.

Lagendijk, R. L. et al., "Encrypted Signal Processing for Privacy Protection," IEEE Signal Processing Magazine, Service Center, Piscataway, NJ. US, vol. 30, No. 1, pp. 82-105, XP011505535.

Baron, Joshua et al., "5PM: Secure Pattern Matching," International Association for Cryptologic Research, vol. 20121219:161334, Dec. 12, 2012, pp. 1-77, XP061007031.

Yasuda, Masaya et al., "Analysis of Lattice Reduction Attack against the Somewhat Homomorphic Encryption Based on Ideal Lattices," Sep. 13, 2012, Advances in Communication Networking: 20th Eunice/IFIP EG 6.2, 6.6 International Workshop, Rennes, France, Sep. 1-5, 2014, Springer Verlag, DE, pp. 1-16, XP047037754.

* cited by examiner

| POSITION | 1 | 2 | 3 | 4 | 5 | 6 | 7 | 8 | 9 | 10 |
|---|---|---|---|---|---|---|---|---|---|---|
| TEXT | a | c | b | a | b | b | a | c | c | b |
| PATTERN | <u>a</u> | b | <u>b</u> | a | c | | | | | |
| | | a | <u>b</u> | b | a | c | | | | |
| | | | a | b | <u>b</u> | a | c | | | |
| | | | | <u>a</u> | b | <u>b</u> | <u>a</u> | <u>c</u> | | |
| | | | | | a | <u>b</u> | b | a | <u>c</u> | |
| | | | | | | a | b | b | a | c |
| SCORE VECTOR | 3 | 1 | 1 | 5 | 2 | 0 | | | | |

CIPHERTEXT PROCESSING DEVICE, CIPHERTEXT PROCESSING METHOD, COMPUTER-READABLE RECORDING MEDIUM, AND INFORMATION PROCESSING DEVICE

CROSS-REFERENCE TO RELATED APPLICATION

This application is based upon and claims the benefit of priority of the prior Japanese Patent Application No. 2014-062743, filed on Mar. 25, 2014, the entire contents of which are incorporated herein by reference.

FIELD

The embodiments discussed herein are related to a ciphertext processing device, a ciphertext processing method, a ciphertext processing program and an information processing device.

BACKGROUND

In recent years, the regulation for the protection of personal information or confidential information has been enhanced and the range of services using the personal or confidential information has widened. In addition, a hiding technique has been used which can utilize data while protecting personal information or confidential information. For example, there is a hiding technique which uses an encryption technique or a statistical technique depending on the type of data or a service requirement.

A homomorphic encryption technique has been known as the hiding technique using the encryption technique. The homomorphic encryption technique is an encryption technique which is one of the public key encryption methods using a pair of different keys in encryption and decryption and can operate encrypted data. For example, for plain texts m1 and m2, when an encryption function of the homomorphic encryption method related to addition or multiplication is E, the following Expressions (1) or (2) are established.

$$E(m1)+E(m2)=E(m1+m2) \quad (1)$$

$$E(m1)*E(m2)=E(m1*m2) \quad (2)$$

Expression (1) is referred to homomorphism for addition and Expression (2) is referred to homomorphism for multiplication.

When the homomorphic encryption method is used, the addition or multiplication of ciphertexts makes it possible to obtain a ciphertext, which is the addition or multiplication result, without decrypting the ciphertext. The properties of the homomorphic encryption are used in, for example, the field of electronic voting or electronic money or the field of cloud computing. Representative examples of the homomorphic encryption method include a Rivest-Shamir-Adleman (RSA) encryption method which is used for multiplication and an Additive ElGamal encryption method which is used for addition.

In recent years, a homomorphic encryption method which can be used for both addition and multiplication has been known. In addition, a homomorphic encryption method has been known which can be used for both addition and multiplication and is practical in terms of both a processing performance and the size of encrypted data.

Here, an example of the homomorphic encryption method will be described. First, three key generation parameters (n, q, t) are mainly prepared for the generation of an encryption key. Here, n is an integer raised to the second power and is called a lattice dimension, q is a prime number, and t is an integer less than the prime number q. In the procedure of an encryption key generation process, first, an n-dimensional polynomial sk having very small coefficients is generated at random with a secret key. The magnitude of each coefficient is limited by a given parameter $\sigma$. Then, an n-dimensional polynomial a1 having each coefficient less than q and an n-dimensional polynomial e having very small coefficients are generated at random.

Then, $a0=-(a1*sk+t*e)$ is calculated and a set (a0, a1) is defined by a public key pk. When a polynomial of a0 is calculated, $x^n=-1$, $x^{n+1}=-x$, ... are calculated for a polynomial of degree n or more to continuously calculate a polynomial of less than degree n. In addition, for the coefficients of the polynomial, the coefficient is divided by the prime number q and the remainder is output. In general, a space in which the above-mentioned calculation is performed is mathematically represented by $Rq: =Fq[x]/(x^n+1)$.

Then, for plain text data m represented by a polynomial of degree n in which each coefficient is less than t and a public key pk=(a0, a1), three polynomials u, f, and g of degree n in which each coefficient is very small are generated at random and the encrypted data E(m, pk)=(c0, c1) of the plain text data m is defined as follows. For (c0, c1), $c0=a0*u+t*g+m$ and $c1=a1*u+t*f$ are calculated. This calculation is also performed in the space Rq.

Then, for two ciphertexts E(m1, pk)=(c0, c1) and E(m2, pk)=(d0, d1), ciphertext addition E(m1, pk)+E(m2, pk) is calculated as (c0+d0, c1+d1) and ciphertext multiplication E(m1, pk)*E(m2, pk) is calculated as (c0+d0, c0*d1+c1*d0, c1*d1). When the ciphertexts are multiplied as described above, it is noted that the data size of the ciphertext changes from a 2-component vector to a 3-component vector.

Finally, a decryption process is performed. For a ciphertext c=(c0, c1, c2, ...) (here, it is assumed that the number of components of ciphertext data increases due to an encryption operation, such as a plurality of ciphertext multiplications), a secret key sk is used to calculate $Dec(c, sk)=[c0+c1*sk+c2*sk+ \ldots ]q \bmod t$. In this way, decryption is performed. Here, for the value of $[z]q$, a remainder w when an integer z is divided by q is calculated. When w<q is satisfied, $[z]q=w$ is output. When $w \geq q$ is satisfied, $[z]q=w-q$ is output. In addition, "a mod t" means the remainder when the integer a is divided by t.

Next, the following numerical example is given for ease of understanding:

Secret key $sk=Mod(Mod(4,1033)*x^3+Mod(4,1033)*x^2+Mod(1,1033)*x,x^4+1)$;

Public key $pk=(a0,a1)$, $a0=Mod(Mod(885,1033)*x^3+Mod(519,1033)*x^2+Mod(621,1033)*x+Mod(327,1033),x^4+1)$, and $a1=Mod(Mod(661,1033)*x^3+Mod(625,1033)*x^3+Mod(861,1033)*x+Mod(311,1033),x^4+1)$; and $E(m,pk)=(c0,c1)$, Plain text data $m=3+2x+2x^2+2x^3$, $c0=Mod(Mod(822,1033)*x^3+Mod(1016,1033)*x^2+Mod(292,1033)*x+Mod(243,1033),x^4+1)$, and $c1=Mod(Mod(840,1033)*x^3+Mod(275,1033)*x^3+Mod(628,1033)*x+Mod(911,1033),x^4+1)$.

In the above-mentioned values, the key generation parameters (n, q, t) are set to (4, 1033, 20). In addition, Mod(a, q) means the remainder when the integer a is divided by the prime number q and Mod(f(x), $x^4+1$) means a polynomial of the remainder when a polynomial f(x) is divided by a polynomial $x^4+1$. However, for example, it is assumed that Mod(f(x), $x^4+1$) means $x^4=-1$, $x^5=x$, . . . .

An application example of the homomorphic encryption method is hidden pattern matching. The hidden pattern matching will be described with reference to FIG. 6. FIG. 6 is a diagram illustrating pattern matching. First, pattern matching is a process of determining whether a pattern string is included in a text string and is, for example, a process of determining whether a pattern string P="abbac" is included in a text string T="acbabbaccb".

In this case, as illustrated in FIG. 6, the number where the text is matched with the pattern is calculated while the pattern string is shifted one character by one character relative to the text string T. In FIG. 6, the number of characters matched with each other is referred to as a score vector. Here, a plurality of distances which are referred to as the score vector are calculated. In this example, since the length of the pattern string P is 5, the text and the pattern are matched with each other at the position of a component with a score vector value of 5. As such, in the pattern matching without encryption, for the text string T and the pattern string P, the distance between the text string and the pattern string P is calculated while the pattern string P is shifted one character by one character.

In the hidden pattern matching using homomorphic encryption, a plurality of distances are calculated, with the text string T and the pattern string P encrypted by homomorphic encryption. Here, as illustrated in FIG. 6, a hidden pattern matching operation model among the three parties, that is, an information registrant having the text string T, a collator having the pattern string P, and a cloud which calculates an encryption distance in the hidden pattern matching is considered.

First, the collator generates a public key and a secret key for generating a homomorphic encryption key and opens only the public key to the public. Here, the collator opens the public key to the information registrant and the cloud. Then, the information registrant encrypts its own text string T with the public key transmitted from the collator, using homomorphic encryption, and stores the encrypted text E(T) in a database of the cloud.

The collator performs homomorphic encryption on the pattern string P and transmits only the encrypted pattern E(P) to the cloud, in order to collate whether the pattern string P is present. The cloud calculates a plurality of distances between the encrypted text E(T) and the encrypted pattern E(P) while encrypting the distances and transmits only the encryption result to the collator. The collator can decrypt the encryption result transmitted from the cloud with its own secret key and determine whether the pattern P is included in the text T on the basis of the decryption result.

Patent Document 1: Japanese Laid-open Patent Publication No. 2000-181486
Patent Document 2: Japanese Laid-open Patent Publication No. 2009-271584
Non-patent Document 1: C. Gentry, "Fully Homomorphic encryption using ideal lattices", STOC 2009, ACM, pp. 169-178, 2009
Non-patent Document 2: K. Lauter, M. Naehrig and V. Vaikuntanathan, "Can Homomorphic Encryption be Practical?", In ACM workshop on Cloud Computing Security Workshop-CCSW 2011, ACM, pp. 113-124, 2011

In the hidden pattern matching using the above-mentioned cloud, since all processes are performed on the cloud, with data being encrypted, data for the information registrant and the collator is not disclosed. Therefore, it is possible to outsource a pattern matching process even in an environment such as cloud with poor security.

Meanwhile, since hidden pattern matching is performed with data being encrypted, only the application of the homomorphic encryption method to the pattern matching is not practical in terms of the amount of data or an operation load and it takes a lot of time for the process.

Detailed application examples of the above-mentioned cloud hidden pattern matching include concealed information search, such as keyword or web search, concealed DNA analysis which is used in criminal investigation or the determination of blood relationship, and a concealed genetic test which is used in an obese genetic test or infection examination.

SUMMARY

According to an aspect of the embodiment, a ciphertext processing device comprises a memory, and a processor coupled to the memory wherein the processor executes a process. The process includes first acquiring a first polynomial into which first text data is converted with a first order and which is encrypted with a first public key and a first square-value polynomial into which square-value vector data of each component of the first text data is converted with the first order and which is encrypted with the first public key; second acquiring a second polynomial into which second text data is converted with a second order and which is encrypted with the first public key and a second square-value polynomial into which square-value vector data of each component of the second text data is converted with the second order and which is encrypted with the first public key; and determining whether the second text data is included in the first text data, using the first polynomial, the first square-value polynomial, the second polynomial, and the second square-value polynomial.

The object and advantages of the invention will be realized and attained by means of the elements and combinations particularly pointed out in the claims.

It is to be understood that both the foregoing general description and the following detailed description are exemplary and explanatory and are not restrictive of the invention.

DESCRIPTION OF EMBODIMENTS

Figure 1:
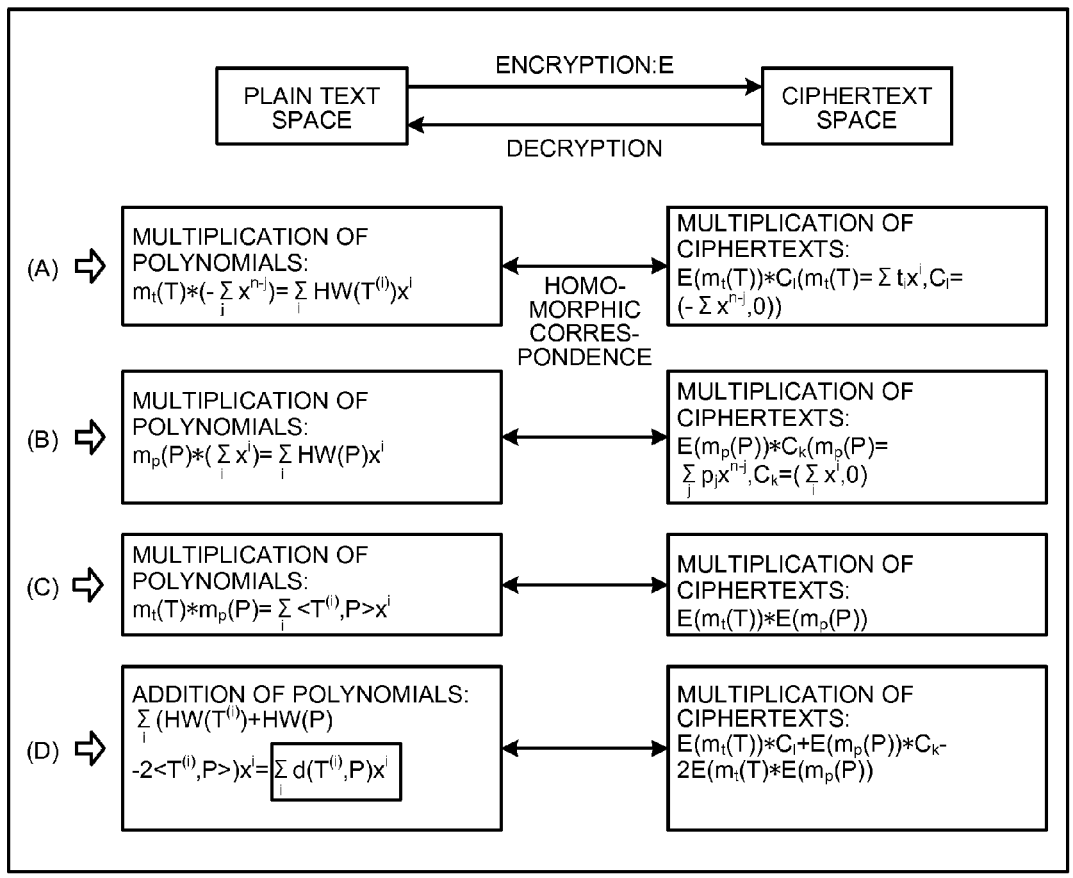
FIG. 1 is a diagram illustrating the calculation of an encryption distance.

Preferred embodiments of the present invention will be explained with reference to accompanying drawings. The invention is not limited to the embodiments. The embodiments can be appropriately combined with each other without departing from the scope and spirit of the invention.

[a] First Embodiment

First, a hidden pattern matching operation will be described using binarized text data. In the hidden pattern matching operation using homomorphic encryption, in order to reduce a data size or a distance calculation score, a polynomial in which bits of a binarized text are used as coefficients of degrees in ascending order is calculated and is encrypted using a homomorphic encryption method which can perform polynomial calculation. In addition, a polynomial in which bits of a binarized pattern are used as coefficients of degrees in descending order is calculated and is encrypted using the same homomorphic encryption method.

Then, encryption is performed on a text polynomial and a pattern polynomial which are encrypted by the homomorphic encryption, using the homomorphism of the polynomial such that each coefficient has a hamming distance between the text and the pattern. Then, the hamming distance is specified from each coefficient of a polynomial obtained by decrypting the encryption result and it is determined whether the hamming distance is 0. In this way, the hidden pattern matching operation is performed.

Specifically, a polynomial $m_t(T)=\Sigma_i t_i x_i$ in which bits of a binarized text (which is also referred to as a binarized vector) $T=(t_0, t_1, \ldots, t_{k-1})$ with a length k are used as coefficients in ascending order is generated. Then, the above-mentioned homomorphic encryption method is performed on the generated polynomial to generate an encrypted text $Enc(m_c(T), pk)$. In this way, the text T is hidden.

Meanwhile, a polynomial $m_p(P)=-\Sigma_j p_j x^{n-j}$ in which bits of a binarized pattern $P=(p_0, p_1, \ldots, p_{l-1})$ with a length l are used as coefficients in descending order is generated. Then, the above-mentioned homomorphic encryption method is performed on the generated polynomial to generate an encrypted pattern $Enc(m_p(P), pk)$. In this way, the pattern P is hidden.

Then, encryption distance calculation is performed on the encrypted text $Enc(m_t(T), pk)$ and pattern $Enc(m_p(P), pk)$ as represented by the following Expression (3).

$$Enc(m_t(T),pk)*C_l+Enc(m_p(P),pk)*C_k-2Enc(m_c(T),pk)*Enc(m_p(P),pk) \quad (3)$$

In Expression (3), $C_l$ is a member including a descending polynomial with the length l and $C_k$ is a member including an ascending polynomial with the length k, which are represented by the following Expressions (4) and (5).

$$C_l=(-\Sigma_j x^{n-j},0) \quad (4)$$

$$C_k=(\Sigma_i x^i,0) \quad (5)$$

When the result obtained by decrypting the encryption distance calculation result obtained by Expression (3) is $r_0+r_1 x+r_2 x^2+\ldots+r_{n-1}x^{n-1}$ (which is represented by a polynomial of degree n with coefficients equal to or less than a parameter t), an i-th-order coefficient $r_i$ (where $0 \le i \le k-1$) is identical to a hamming distance $d(T^{(i)}, P)$ between a partial text $T^{(i)}$ having an i-th bit as a first bit and the pattern P. Therefore, the degree with a coefficient of 0 is preferably specified by determining the position of the pattern P in the text T from the decryption result $r_0+r_1 x+r_2 x^2+\ldots+r_{n-1}x^{n-l}$. That is, it is possible to calculate the text T and the pattern P while hiding them with homomorphic encryption.

Here, the hidden pattern matching calculation according to this embodiment will be described with reference to FIG. 1. In a plain text space, the following calculation is performed such that the coefficients of the polynomial have the hamming distance $d(T^{(i)}, P)$ therebetween.

$$\Sigma_i(HW(T^{(i)})+HW(P)-2<T^{(i)},P>)x^i \quad (6)$$

(where HW(A) indicates a hamming weight of A and <A, B> indicates the inner product of A and B).

In Expression (6), $\Sigma_i HW(T^{(i)})x^i$ is $m_c(T)*(-\Sigma_j x^{n-j})$, as illustrated in FIG. 1(A). In addition, in Expression (6), $\Sigma_i HW(P)x^i$ is $m_p(P)*(\Sigma_i x^i)$, as illustrated in FIG. 1(B). In Expression (6), $\Sigma_i <T^{(i)}, P>x^i$ is $m_c(T)*m_p(P)$, as illustrated in FIG. 1(C).

In this way, as illustrated in FIGS. 1(A) to 1(C), encryption corresponding to the calculation of each plain text is obtained in a ciphertext space. Therefore, as a result, as illustrated in FIG. 1(D), the encryption represented by Expression (3) is performed and decryption is performed such that the coefficients have the hamming distance therebetween.

However, in the calculation of a plain text polynomial, $x^n=-1$, $x^{n+i}=-x$, ... are calculated for a polynomial of degree n or more to continuously calculate a polynomial of degree n or less. The coefficients of each polynomial of degree n or less are divided by the parameter t and the remainders are output. In general, the space in which the above-mentioned calculation is performed is represented by $Rt=Fq[x]/(x^n+1)$.

Here, a numerical example of the operation according to this embodiment will be described. The following method is considered: it is determined whether a pattern P=(1, 0, 1) with a length l=3 is included in a binarized text T=(1, 1, 0, 1, 1, 1, 0, 1) with a length k=8 while the text T and the pattern P are hidden with homomorphic encryption. In practice, the second and sixth partial vectors $T^{(2)}$ and $T^{(6)}$ in the text T are identical to each other.

In order to treat a vector with a length k=8, parameters of the homomorphic encryption method are set as follows: n=8; q=1073741857 (30-bit prime number); and t=n=8. In this case, a secret key sk and a public key pk are as follows:

Secret key $sk=Mod(Mod(2,1073741857)*x^6+Mod(5, 1073741857)*x^5+Mod(5,1073741857)*x^4*Mod (5,1073741857)*x+Mod(6,1073741857)*x^2+ Mod(1,1073741857)*x,x^8+1)$; and Public key $pk=(a0,a1)$, $a0=Mod(Mod(943067072,1073741857)*x^7+Mod (208992892,1073741857)*x^6+Mod(757863697, 1073741857)*x^5+Mod(463766550, 1073741857)*x^4+Mod(868678190, 1073741857)*x^3+Mod(79684227, 1073741857)*x^2+Mod(794283856, 1073741857)*x+Mod(118588567,1073741857), x^8+1)$, and $a1=Mod(Mod(476812016,1073741857)*x^7+Mod (135271255,1073741857)*x^6+Mod(610902088, 1073741857)*x^5+Mod(561030593, 1073741857)*x^4+Mod(693790135, 1073741857)*x^3+Mod(656347688, 1073741857)*x^2+Mod(903267448, 1073741857)*x+Mod(326511477,1073741857), x^8+1)$.

Then, for the homomorphic encryption of the text T, first, a text polynomial $m_c(T)=1+x+x^3+x^4+x^5+x^7$ is generated and is then encrypted with the public key pk to obtain the following:

$Enc(m_c(T),pk)=(c0,c1)$;

$c0+\text{Mod}(\text{Mod}(571455796,1073741857)*x^7+\text{Mod}(134025403,1073741857)*x^6+\text{Mod}(5586025,1073741857)*x^5+\text{Mod}(982959780,1073741857)*x^4+\text{Mod}(172339206,1073741857)*x^3+\text{Mod}(484151018,1073741857)*x^2+\text{Mod}(843536573,1073741857)*x+\text{Mod}(647203954,1073741857),x^8+1)$; and $xc1=\text{Mod}(\text{Mod}(483026714,1073741857)*x^7+\text{Mod}(807015171,1073741857)*x^6+\text{Mod}(282283030,1073741857)*x^5+\text{Mod}(326992586,1073741857)*x^4+\text{Mod}(809754218,1073741857)*x^3+\text{Mod}(19049111,1073741857)*x^2+\text{Mod}(406264220,1073741857)*x+\text{Mod}(18166841,1073741857),x^8+1)$.

Then, for the homomorphic encryption of the pattern P, a pattern polynomial $m_p(P)=-x^n-x^{n-l}-x^{n-2}=1-x^6-x^7$ (length l=3) is generated and is then encrypted with the public key pk to obtain the following:

$Enc(m_p(p),pk)=(b0,b1)$;

$b0=\text{Mod}(\text{Mod}(559859414,1073741857)*x^7+\text{Mod}(567905533,1073741857)*x^6+\text{Mod}(12416926,1073741857)*x^5+\text{Mod}(844327741,107374187)*x^4+\text{Mod}(167539656,1073741857)*x^3+\text{Mod}(473962809,1073741857)*x^2+\text{Mod}(200462840,1073741857)*x+\text{Mod}(281512325,1073741857),x^8+1)$; and $b1+\text{Mod}(\text{Mod}(866509748,1073741857)*x^7+\text{Mod}(110516036,1073741857)*x^6+\text{Mod}(103878204,1073741857)*x^5+\text{Mod}(419487345,1073741857)*x^4+\text{Mod}(208664258,1073741857)*x^3+\text{Mod}(230233533,1073741857)*x^2+\text{Mod}(428440586,1073741857)*x+\text{Mod}(1069138858,1073741857),x^8+1)$.

For the encrypted text $Enc(m_c(T), pk)$ and the encrypted pattern $Enc(m_p(P), pk)$, $C_l=-x^n-x^{n-l}-x^{n-2}=1-x^6-x^7$ (length l=3) and $C_k=1+x+x^2+x^3+x^4+x^5+x^6+x^7$ (length k=8) are generated. Then, an encryption distance calculation result (d0, d1, d2) is calculated by Expression (3) as follows:

$d0=\text{Mod}(\text{Mod}(797968254,1073741857)*x^7+\text{Mod}(466213893,1073741857)*x^6+\text{Mod}(252129696,1073741857)*x^5+\text{Mod}(1009528361,1073741857)*x^4+\text{Mod}(535752679,1073741857)*x^3+\text{Mod}(91616621,1073741857)*x^2+\text{Mod}(627437050,1073741857)*x+\text{Mod}(983411190,1073741857),x^8+1)$;

$d1=\text{Mod}(\text{Mod}(702170729,1073741857)*x^7+\text{Mod}(300526001,1073741857)*x^6+\text{Mod}(385829973,1073741857)*x^5+\text{Mod}(6675019,1073741857)*x^4+\text{Mod}(571006407,1073741857)*x^3+\text{Mod}(627553259,1073741857)*x^2+\text{Mod}(657519649,1073741857)*x+\text{Mod}(465629239,1073741857),x^8+1)$; and $d2=\text{Mod}(\text{Mod}(249662899,1073741857)*x^7+\text{Mod}(819300197,1073741857)*x^6+\text{Mod}(802151858,1073741857)*x^5+\text{Mod}(1002057738,1073741857)*x^4+\text{Mod}(759197621,1073741857)*x^3+\text{Mod}(488279887,1073741857)*x^2+\text{Mod}(105297021,1073741857)*x+\text{Mod}(517181369,1073741857),x^8+1)$.

Finally, when the encryption result is decrypted with the secret key sk, the decryption result is a vector m=[2, 0, 2, 2, 2, 0, 2, 7]. Among the values, zero-th to (k-l)-th (=8-3=5) values are used for a determination process. This is represented by a polynomial $2+2x^2+2x^3+2x^4$ and the coefficients of the first-order and fifth-order terms of x are 0.

Therefore, the pattern P is identical to the second and sixth partial vectors $T^{(2)}$ and $T^{(6)}$ of the text T.

[b] Second Embodiment

In the first embodiment, only the encryption hamming distance is calculated for the binarized text pattern. Therefore, the length of the vector of the original text pattern is increases by binarization and the encryption process score increases. For example, one character in four character strings A, T, C, and G which are used in the DNA base is binarized into, for example, [00], [01], [10], or [11]. Therefore, the length of the binarized character is two times more than that of one character of the original character strings A, T, C, and G.

In the second embodiment, an example in which the encryption distance of the general text pattern which is not binarized, but is numerically vectorized can be calculated at high speed such that the encryption process score does not increase will be described. Here, for example, an $L^2$ norm distance $\Sigma(t_i-p_i)^2$ is considered.

Overall Structure

Figure 2:
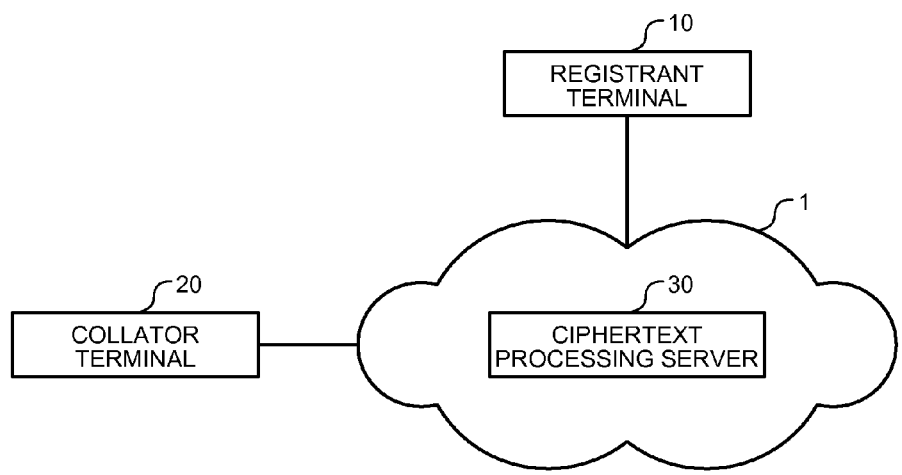
FIG. 2 is a diagram illustrating an example of the overall structure of a system according to a second embodiment.

FIG. 2 is a diagram illustrating an example of the overall structure of a system according to the second embodiment. As illustrated in FIG. 2, the system is an encryption system which includes a registrant terminal 10, a collator terminal 20, and a ciphertext processing server and uses cloud computing. In the structure illustrated in FIG. 2, the number of devices is illustrative and is not limited to that illustrated in FIG. 2.

The registrant terminal 10 registers text strings in the ciphertext processing server 30 and is, for example, a personal computer, a general-purpose server, or a smart phone. The registrant terminal 10 registers a text string including the pattern string to be collated in the ciphertext processing server 30.

The collator terminal 20 is, for example, a personal computer, a general-purpose server, or a smart phone which requests the pattern matching of a pattern string. The collator terminal 20 requests the ciphertext processing server 30 to check whether a specific character string pattern is included in the text string registered by the registrant terminal 10 and obtains the check result.

The ciphertext processing server 30 is a device that performs pattern matching and is, for example, a personal computer, a general-purpose server, or a smart phone. Specifically, the ciphertext processing server 30 performs the pattern matching between the pattern string requested by the collator terminal 20 and the text string registered in the registrant terminal 10 and transmits the result as a response to the collator terminal 20.

In this system, the ciphertext processing server acquires a first polynomial in which first text data is arranged in a first order and which is encrypted with a first public key and a first square-value polynomial in which the square-value vector data of each component of the first text data is arranged in the first order and which is encrypted with the first public key. The ciphertext processing server 30 acquires a second polynomial in which second text data is arranged in a second order and which is encrypted with the first public key and a second square-value polynomial in which the square-value vector data of each component of the second text data is arranged in the second order and which is encrypted the first public key. Then, the ciphertext processing server 30 determines whether the second text data is included in the first text data on the basis of the first polynomial, the first square-value polynomial, the second polynomial, and the second square-value polynomial.

That is, the ciphertext processing server 30 matches two numerically vectorized text data items, which are hidden by homomorphic encryption, using the square-value vector sequence of each vector component of each text data item. As a result, the ciphertext processing server can reduce a processing load in the hidden pattern matching.

Structure of Devices

Figure 3:
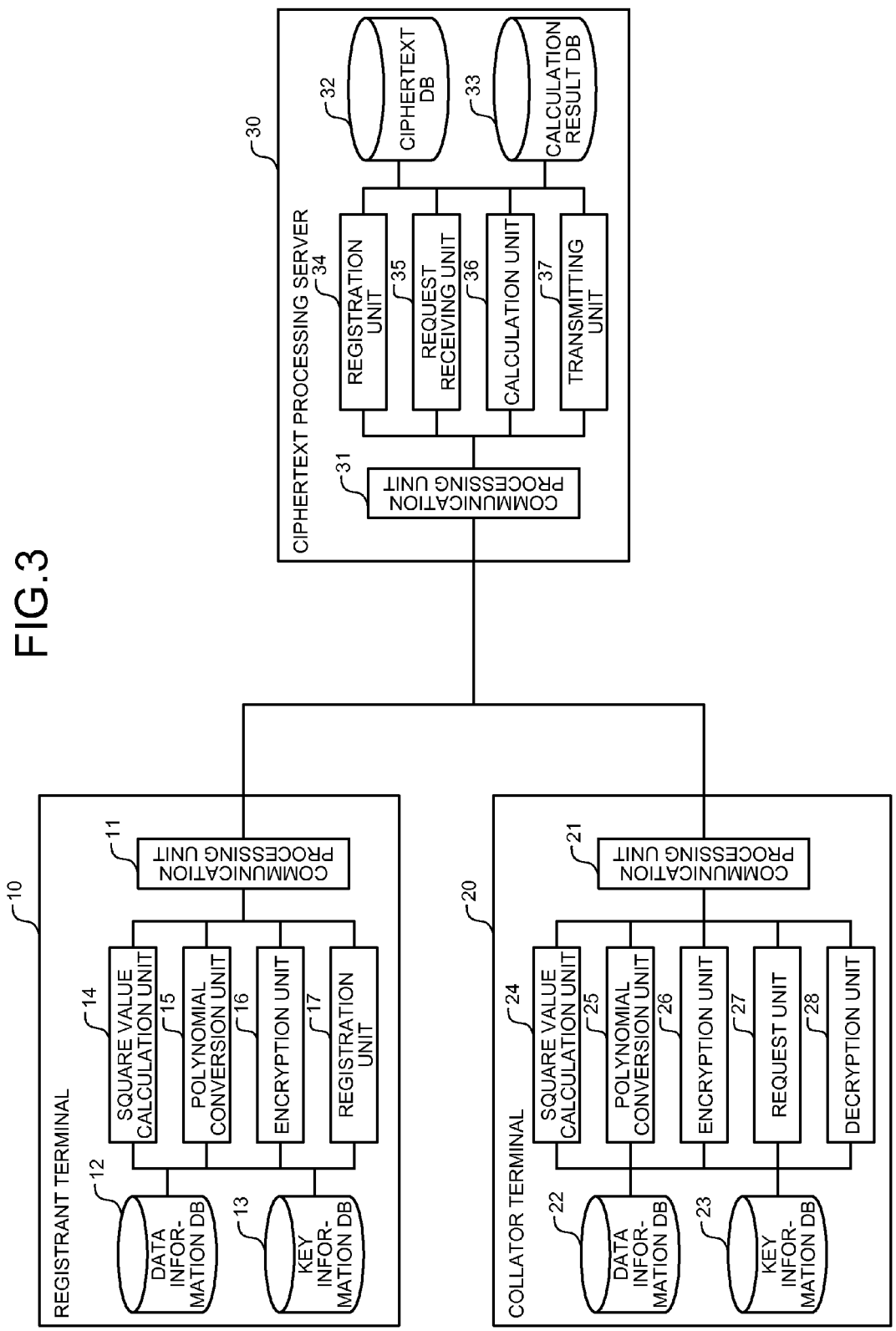
FIG. 3 is a functional block diagram illustrating the functional structure of each device according to the second embodiment.

Next, the functional structure of each device forming the system illustrated in FIG. 2 will be described. FIG. 3 is a functional block diagram illustrating the functional structure of each device according to the second embodiment.

Functional Structure of Registrant Terminal

As illustrated in FIG. 3, the registrant terminal 10 includes a communication processing unit 11, a data information DB 12, a key information DB 13, a square value calculation unit 14, a polynomial conversion unit 15, an encryption unit 16, and a registration unit 17. The square value calculation unit 14, the polynomial conversion unit 15, the encryption unit 16, and the registration unit 17 are examples of the processes performed by a processor or circuits of an electronic circuit.

The communication processing unit 11 is a processing unit that controls communication with the ciphertext processing server 30 in a cloud system 1 and is, for example, a network interface card. For example, the communication processing unit 11 transmits, for example, encrypted data to the ciphertext processing server 30. In addition, the communication processing unit 11 establishes, for example, a web session with the ciphertext processing server 30 and transmits and receives various kinds of data.

The data information DB 12 is a database that stores the text string to be matched. For example, the data information DB 12 stores a numerically-vectorized text $T=(t_0, t_1, \ldots, t_{k-1})$. In addition, the data information DB 12 is stored in a storage device such as a hard disk or a semiconductor memory.

The key information DB 13 is a database that stores, for example, the public key and secret key of the user of the registrant terminal 10 or the public key of the collator. For example, the key information DB 13 stores the public key pk of the collator which is generated with key parameters (n, q, t). Key information is acquired from the collator terminal 20 in advance and is then stored. The key information DB 13 is stored in a storage device such as a hard disk or a semiconductor memory.

The square value calculation unit 14 is a processing unit that calculates the square-value vector sequence of each component of the text data stored in the data information DB 12. For example, the square value calculation unit 14 calculates a square-value vector $T^2=(t_0^2, t_1^2, \ldots, t_{k-1}^2)$ of each component of the text $T=(t_0, t_1, \ldots, t_{k-1})$. In addition, the square value calculation unit 14 stores the calculation result in, for example, a memory.

The polynomial conversion unit 15 is a processing unit that converts each of the text data stored in the data information DB 12 and the square-value vector calculated by the square value calculation unit 14 into a polynomial. Specifically, the polynomial conversion unit 15 performs the polynomial conversion using the same method as that in the first embodiment. For example, the polynomial conversion unit 15 performs the same ascending-order polynomial conversion as that in the first embodiment on the text $T=(t_0, t_1, \ldots, t_{k-1})$ to generate a polynomial m(T). In addition, the polynomial conversion unit 15 performs the ascending-order polynomial conversion on the square-value vector $T^2=(t_0^2, t_1^2, \ldots, t_{k-1}^2)$ to generate a polynomial $m(T^2)$. The polynomial conversion unit 15 stores the calculation result in, for example, a memory.

The encryption unit 16 is a processing unit that generates a homomorphic ciphertext in each polynomial which is converted by the polynomial conversion unit 15. Specifically, the encryption unit 16 encrypts the polynomial m(T) and the polynomial $m(T^2)$ with the public key pk of the collator stored in the key information DB 13. For example, the encryption unit 16 generates two ciphertexts (Enc(m(T), pk), Enc(m($T^2$), pk)). The encryption unit 16 stores the calculation result in, for example, a memory.

The registration unit 17 is a processing unit that registers the ciphertexts generated by the encryption unit 16 in the ciphertext processing server 30. For example, the registration unit 17 transmits the two ciphertexts (Enc(m(T), pk), Enc(m($T^2$), pk)) to the ciphertext processing server 30. That is, the registration unit 17 registers the data to be matched in the ciphertext processing server 30.

Functional Structure of Collator Terminal

As illustrated in FIG. 3, the collator terminal 20 includes a communication processing unit 21, a data information DB 22, a key information DB 23, a square value calculation unit 24, a polynomial conversion unit 25, an encryption unit 26, a request unit 27, and a decryption unit 28. The square value calculation unit 24, the polynomial conversion unit 25, the encryption unit 26, the request unit 27, and the decryption unit 28 are examples of the processes performed by the processor or the circuits of the electronic circuit.

The communication processing unit 21 is a processing unit that controls communication with the ciphertext processing server 30 in the cloud system 1 and is, for example, a network interface card. For example, the communication processing unit 11 transmits, for example, encrypted data or a collation request to the ciphertext processing server 30. In addition, the communication processing unit 11 establishes, for example, a web session with the ciphertext processing server 30 and transmits and receives various kinds of data.

The data information DB 22 is a database that stores the text string to be collated. For example, the data information DB 22 stores a numerically vectorized text $P=(p_0, p_1, \ldots, p_{k-1})$. In addition, the data information DB 22 is stored in a storage device such as a hard disk or a semiconductor memory.

The key information DB 23 is a database that stores, for example, the public key and secret key of the user of the collator terminal 20. For example, the key information DB 23 stores the public key pk or secret key sk of the collator which is generated with the key parameters (n, q, t). The key information DB 23 is stored in a storage device such as a hard disk or a semiconductor memory.

The square value calculation unit 24 is a processing unit that calculates the square-value vector sequence of each component of the text data stored in the data information DB 22. For example, the square value calculation unit 24 calculates a square-value vector $P^2=(p_0^2, p_1^2, \ldots, p_{k-1}^2)$ of each component of the text $P=(p_0, P_1, \ldots, p_{k-1})$. In addition, the square value calculation unit 24 stores the calculation result in, for example, a memory.

The polynomial conversion unit 25 is a processing unit that converts each of the text data stored in the data information DB 22 and the square-value vector calculated by the square value calculation unit 24 into a polynomial. Specifically, the polynomial conversion unit 25 performs the polynomial conversion using the same method as that in the first embodiment. For example, the polynomial conversion unit 25 performs the same descending-order polynomial conversion as that in the first embodiment on the text $P=(p_0, p_1, \ldots, p_{k-1})$ to generate a polynomial m'(P). In addition, the polynomial conversion unit 25 performs the descending-order polynomial conversion on the square-value vector $P^2=(p_0^2, p_1^2, \ldots, p_{k-1}^2)$ to generate a polynomial m'($P^2$). The polynomial conversion unit 25 stores the calculation result in, for example, a memory.

The encryption unit 26 is a processing unit that generates a homomorphic ciphertext in each polynomial which is converted by the polynomial conversion unit 25. Specifically, the encryption unit 26 encrypts the polynomial m'(P) and the polynomial m'($P^2$) with the public key pk of the collator stored in the key information DB 23. For example, the encryption unit 16 generates two ciphertexts (Enc(m'(P), pk), Enc(m'($P^2$), pk)). The encryption unit 26 stores the calculation result in, for example, a memory.

The request unit 27 is a processing unit that requests pattern matching. Specifically, the request unit 27 transmits an encryption portion to be collated to the ciphertext processing server 30 to request pattern matching. For example, the request unit 27 transmits the two ciphertexts (Enc(m'(P), pk), Enc(m'($P^2$), pk)) to the ciphertext processing server 30.

The decryption unit 28 is a processing unit that receives the collation result from the ciphertext processing server 30 and decrypts the collation result to obtain the result of the pattern matching. For example, the decryption unit 28 acquires "Enc(m($T^2$), pk)*Cl+Enc(m'($P^2$), pk)*Ck'−2Enc(m(T), pk)*Enc(m'(P), pk)" as the collation result from the ciphertext processing server 30. Cl and Ck' will be described below.

Then, the decryption unit 28 decrypts the acquired "Enc(m($T^2$), pk)*Cl+Enc(m'($P^2$), pk)*Ck'−2Enc(m(T), pk)*Enc(m'(P), pk)" with the secret key sk to obtain a polynomial $m=\Sigma m_i x^i$ as the decryption result. The decryption unit 28 checks whether a coefficient m (where i=0, 1, . . . , k−1) of the polynomial m is identical to an $L^2$ distance $\Sigma(t_{i+j}-p_j)^2$ between T and P and the value thereof is 0 and determines a portion of the text T which is identical to the pattern P, on the basis of the check result.

Specifically, if there is a value of 0, the decryption unit 28 determines that the pattern P is included in the text T. However, if not, the decryption unit 28 determines that the pattern P is not included in the text T.

The principle of the determination is based on the homomorphic characteristics of homomorphic encryption on the polynomial. Specifically, the above-mentioned encryption distance calculation corresponds to polynomial calculation $m(T^2)*(-\Sigma x^{n-j})+m'(P^2)=\Sigma x^j-2m(T)*m'(P)$ on a ring R=Z[x]/($x^n$+1) in the plain text which is not encrypted and the calculation result is identical to the polynomial m which is obtained by decryption with the secret key sk. Therefore, the above-mentioned polynomial calculation proves that the coefficient $m_i$ (where i=0, 1, . . . , k−1) of the polynomial m is identical to the $L^2$ distance $\Sigma(t_{i+j}-p_j)^2$.

Functional Structure of Ciphertext Processing Server

As illustrated in FIG. 3, the ciphertext processing server 30 includes a communication processing unit 31, a ciphertext DB 32, a calculation result DB 33, a registration unit 34, a request receiving unit 35, a calculation unit 36, and a transmitting unit 37. The registration unit 34, the request receiving unit 35, the calculation unit 36, and the transmitting unit 37 are examples of the process performed by the processor or the circuits of the electronic circuit.

The communication processing unit 31 is a processing unit that controls communication with the registrant terminal 10 or the collator terminal 20 and is, for example, a network interface card. For example, the communication processing unit 31 receives, for example, encrypted data or various requests. In addition, the communication processing unit 31 establishes, for example, a web session with each terminal and transmits and receives various kinds of data.

The ciphertext DB 32 is a database that stores the ciphertexts received from each terminal. For example, the ciphertext DB 32 stores the ciphertexts (Enc(m(T), pk), Enc(m($T^2$), pk)) received from the registrant terminal 10. In addition, the ciphertext DB 32 stores two ciphertexts (Enc(m'(P), pk), Enc(m'($P^2$), pk)) received from the collator terminal 20.

The calculation result DB 33 is a database that stores the pattern matching result. For example, the calculation result DB 33 stores "Enc(m($T^2$), pk)*Cl+Enc(m'($P^2$), pk)*Ck'−2Enc(m(T), pk)*Enc(m'(P), pk)" as the result of the pattern matching. The ciphertext DB 32 or the calculation result DB 33 is stored in a storage device, such as a hard disk or a semiconductor memory.

The registration unit 34 is a processing unit that receives the data to be matched from the registrant terminal 10 and registers the received data in the ciphertext DB 32. As described above, the registration unit 34 receives two ciphertexts (Enc(m(T), pk), Enc(m($T^2$), pk)) from the registrant terminal 10 and registers the received two ciphertexts in the ciphertext DB 32.

The request receiving unit 35 is a processing unit that receives a pattern matching request from the collator terminal 20. In addition, the request receiving unit 35 receives two ciphertexts (Enc(m'(P), pk), Enc(m'($P^2$), pk)) to be collated in addition to the pattern matching request and registers the two ciphertexts in the ciphertext DB 32.

The calculation unit 36 is a processing unit that performs pattern matching. Specifically, the calculation unit 36 performs the pattern matching between the two ciphertexts (Enc(m(T), pk), Enc(m($T^2$), pk)) acquired from the registrant terminal 10 and the two ciphertexts (Enc(m'(P), pk), Enc(m'($P^2$), pk)) acquired from the collator terminal 20. Then, the calculation unit 36 registers the calculation result in the calculation result DB 33.

That is, the calculation unit 36 calculates the encryption $L^2$ distance between the numerically vectorized text T and the pattern P. For example, the calculation unit 36 calculates distance calculation auxiliary data items $Cl=(-\Sigma x^{n-j}, 0)$ and $Ck'=(\Sigma x^j, 0)$ and calculates "Enc(m($T^2$), pk)*Cl+Enc(m'($P^2$), pk)*Ck'−2Enc(m(T), pk)*Enc(m'(P), pk)" as the encryption distance.

The transmitting unit 37 is a processing unit that transmits the calculation result of the pattern matching to the collator terminal 20. For example, the calculation unit 36 reads "Enc(m(T), pk)*Cl+Enc(m'($P^2$), pk)*Ck'−2Enc(m(T), pk)*Enc(m'(P), pk)", which is the calculation result, from the calculation result DB 33 and transmits the calculation result to the collator terminal 20.

Flow of Process

Figure 4:
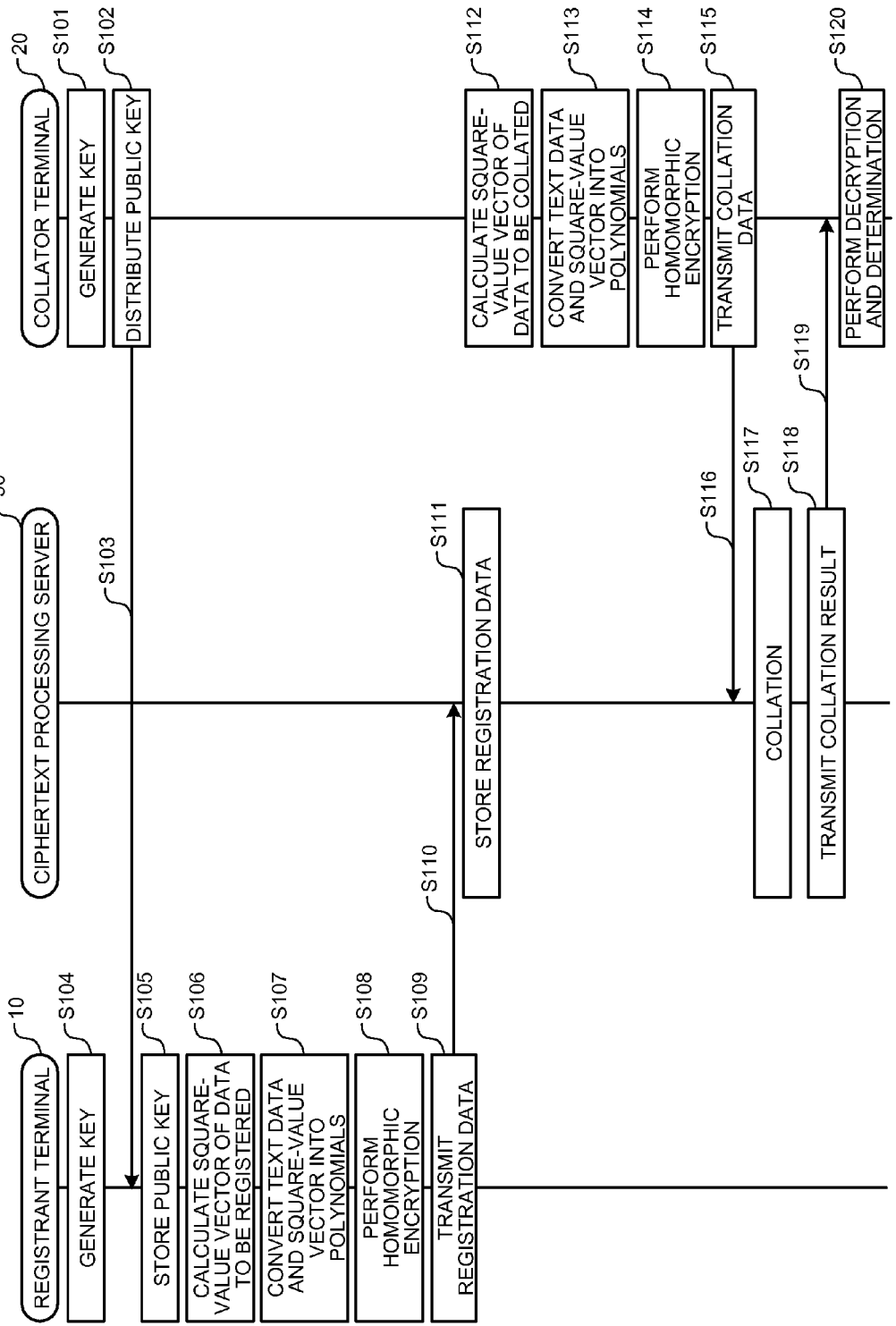
FIG. 4 is a sequence diagram illustrating a process performed by the system according to the second embodiment.

FIG. 4 is a sequence diagram illustrating the process performed by the system according to the second embodiment. As illustrated in FIG. 4, the collator terminal 20 generates the public key pk and secret key sk of the collator with the key parameters (n, q, t) (step S101) and distributes the generated public key pk to the registrant terminal 10 (step S102 and step S103). Similarly, the registrant terminal 10 generates the public key and secret key of the registrant and stores the generated public key and secret key (step S104). In addition, the registrant terminal 10 stores the public key pk received from the collator terminal 20 in the key information DB 13 (step S105).

Then, the registrant terminal 10 reads the data to be registered, that is, the text data T to be matched from the data information DB 12 and calculates the square-value vector sequence of each component (step S106).

Then, the registrant terminal 10 converts each of the text data T to be registered and the square-value vector $T^2$ into a polynomial (step S107).

Then, the registrant terminal 10 performs homomorphic encryption on each polynomial using the public key pk of the collator terminal 20 (step S108) and transmits the generated encrypted data as registration data to the ciphertext processing server 30 (step S109 and step S110). Then, the ciphertext processing server 30 stores the encrypted data received from the registrant terminal 10 in the ciphertext DB 32 (step S111).

The collator terminal 20 calculates the square-value vector $P^2$ of the text data P to be collated (step S112) and converts each of the text data P to be collated and the square-value vector $P^2$ into a polynomial (step S113).

Then, the collator terminal 20 performs homomorphic encryption on each polynomial using its own public key pk (step S114), transmits the generated encrypted data to be collated to the ciphertext processing server 30, and requests the execution of pattern matching (step S115 and step S116).

Then, the ciphertext processing server 30 performs a collation process, that is, the pattern matching between two ciphertexts of the text data to be matched and two ciphertexts to be collated (step S117) and transmits the collation result to the collator terminal 20 (step S118 and step S119).

Then, the collator terminal 20 decrypts the collation result received from the ciphertext processing server 30 with its own secret key sk and obtains the determination result (step S120).

Effect

As described above, in the system according to the second embodiment, hidden $L^2$ norm calculation using homomorphic encryption is performed on the numerically vectorized text pattern. At that time, in the system, when the numerical vector of the text pattern is encrypted, the vector sequence of the square value of each vector component is created and the ciphertext of the polynomial obtained by the same conversion as that in the first embodiment on the square-value vector is added as auxiliary encryption data. In the system, during encryption La norm distance calculation, calculation is performed using the auxiliary encryption data. As a result, the system can reduce the processing load of the hidden pattern matching.

[c] Third Embodiment

The embodiments of the invention have been described above. However, the invention is not limited to the above-described embodiments and various modifications of the invention can be made.

Terminal

In the above-described embodiments, the terminal that generates the data to be matched and the terminal that generates the data to be collated are individually provided. However, the invention is not limited thereto. For example, one terminal may generate the two data items and direct a server on the cloud to perform pattern matching.

System

Some or all of the processes according to this embodiment which are automatically performed may be manually performed. Alternatively, some or all of the processes according to this embodiment which are manually performed may be automatically performed by the known method. In addition, information including the processing procedure, the control procedure, the detailed names, and various kinds of data or parameters which are described in the specification and the drawings can be arbitrarily changed except when it is specially mentioned.

The functional concept of each component of each device is illustrated in the drawings and each component of each device does not necessarily have the physical structure illustrated in the drawings. That is, the detailed form of the dispersion or integration of each device is not limited to that illustrated in the drawings. In other words, all or some of the devices can be functionally or physically dispersed and integrated in an arbitrary unit, depending on various loads or use conditions. Moreover, all or some of the processing functions which are performed by each device can be implemented by a CPU and a program that is analyzed and executed by the CPU or they can be implemented as hardware by wired logic.

Hardware

Figures 5, 6:
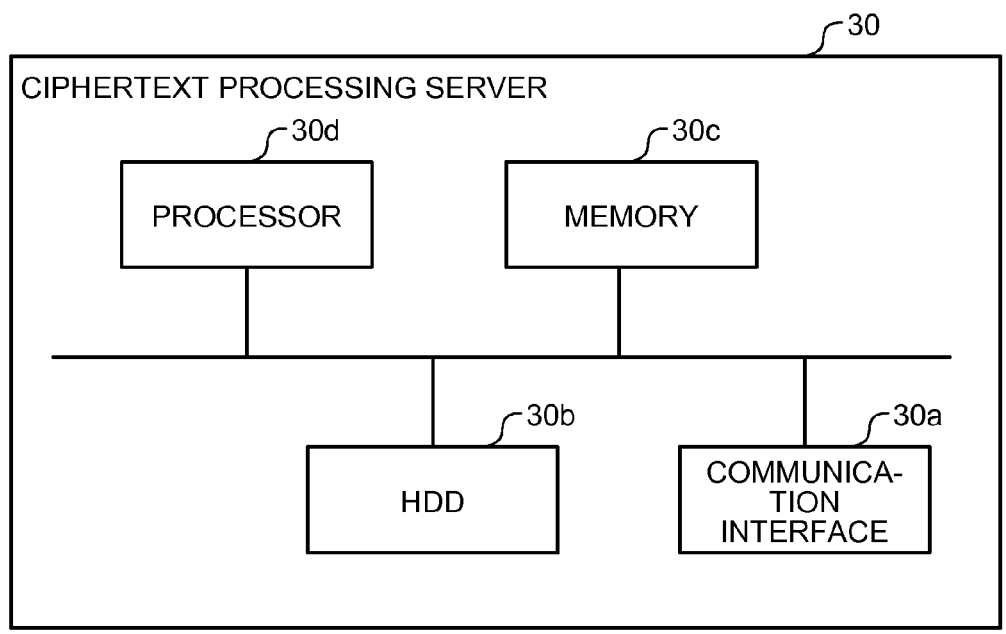
FIG. 5 is a diagram illustrating an example of hardware configuration.
FIG. 6 is a diagram illustrating pattern matching.

FIG. 5 is a diagram illustrating an example of hardware configuration. The devices illustrated in FIG. 2 have the same hardware configuration. Therefore, here, the ciphertext processing server 30 will be described as an example.

As illustrated in FIG. 5, the ciphertext processing server 30 includes a communication interface 30*a*, a hard disk drive (HDD) 30*b*, a memory 30*c*, and a processor 30*d*. The units illustrated in FIG. 5 are connected to each other by, for example, a bus.

The communication interface 30*a* is an interface that controls communication with other devices and is, for example, a network interface card. The HDD 30*b* stores a program or a DB for implementing the functions illustrated in, for example, FIG. 3.

The processor 30*d* reads a program which implements the same functions as those of the processing units illustrated in, for example, FIG. 3 from the HDD 30*b* and develops the program in the memory 30*c* to operate the process for implementing each function illustrated in FIG. 3.

That is, the process performs the same functions as those of the processing units of the ciphertext processing server 30. Specifically, for example, the processor 30*d* reads the program having the same functions as the registration unit 34, the request receiving unit 35, the calculation unit 36, and the transmitting unit 37 from the HDD 30*b* Then, the processor 30*d* performs the process that performs the same functions as those of the registration unit 34, the request receiving unit 35, the calculation unit 36, and the transmitting unit 37.

As such, the ciphertext processing server 30 operates as an information processing device that reads a program and executes the program to perform a ciphertext process method. In addition, the ciphertext processing server 30 may read the program from a recording medium using a medium reading device and execute the read program to implement the same functions as those in the above-described embodiment. Programs described in other embodiments are not limited to the program executed by the ciphertext processing server 30. For example, the invention can be similarly applied even when other computers or servers execute the program or even when the computer and the server execute the program in cooperation with each other.

According to an embodiment, it is possible to reduce a processing load in hidden pattern matching.

All examples and conditional language recited herein are intended for pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. A ciphertext processing device comprising:
a memory, and
a processor coupled to the memory wherein the processor executes a process comprising:
first acquiring a first polynomial in which a plurality of bits included in a numerically vectorized first text data are set to coefficients in an ascending order and which is encrypted in a homomorphic encryption with a first public key and a first square-value polynomial in which a plurality of bits included in square-value vector data of each component of the numerically vectorized first text data are set to coefficients in the ascending order and which is encrypted in the homomorphic encryption with the first public key;
second acquiring a second polynomial in which a plurality of bits included in a numerically vectorized second text data are set to coefficients in a descending order and which is encrypted in the homomorphic encryption with the first public key and a second square-value polynomial in which a plurality of bits included in square-value vector data of each component of the numerically vectorized second text data are set to coefficients in the descending order and which is encrypted in the homomorphic encryption with the first public key; and
calculating a first auxiliary data item for aggregating the each coefficient of the each term of the first polynomial, calculating a second auxiliary data item for aggregating the each coefficient of the each term of the first square-value polynomial, and calculating an encryption norm distance between the numerically vectorized first text data and the numerically vectorized second text data by executing a pattern matching which determines whether the numerically vectorized second text data is included in the numerically vectorized first text data, while maintaining the encrypting, using the first polynomial, the first square-value polynomial, the second polynomial, the second square-value polynomial, the first auxiliary data item, and the second auxiliary data item.

2. The ciphertext processing device according to claim 1, wherein the process further comprises:
transmitting the encryption norm distance which is encrypted with the first public key to a terminal device with a first secret key corresponding to the first public key.

3. A ciphertext processing method comprising:
acquiring a first polynomial in which a plurality of bits included in a numerically vectorized first text data are set to coefficients in an ascending order and which is encrypted in a homomorphic encryption with a first public key and a first square-value polynomial in which a plurality of bits included in square-value vector data of each component of the numerically vectorized first text data are set to coefficients in the ascending order and which is encrypted with in the homomorphic encryption the first public key, using a processor;

acquiring a second polynomial in which a plurality of bits included in a numerically vectorized second text data are set to coefficients in a descending order and which is encrypted in the homomorphic encryption with the first public key and a second square-value polynomial in which a plurality of bits included in square-value vector data of each component of the numerically vectorized second text data are set to coefficients in the descending order and which is encrypted in the homomorphic encryption with the first public key, using the processor;
calculating a first auxiliary data item for aggregating the each coefficient of the each term of the first polynomial,
calculating a second auxiliary data item for aggregating the each coefficient of the each term of the first square-value polynomial, and
calculating an encryption norm distance between the numerically vectorized first text data and the numerically vectorized second text data by executing a pattern matching which determines whether the second text data is included in the first text data, using the first polynomial, while maintaining the encrypting, the first square-value polynomial, the second polynomial, the second square-value polynomial, the first auxiliary data item, and the second auxiliary data item, using the processor.

4. The ciphertext processing method according to claim 3, wherein the method further comprises:
transmitting the encryption norm distance which is encrypted with the first public key to a terminal device with a first secret key corresponding to the first public key.

5. A non-transitory computer-readable recording medium having stored therein a ciphertext processing program that causes a computer to execute a process comprising:
acquiring a first polynomial in which a plurality of bits included in a numerically vectorized first text data are set to coefficients in an ascending order and which is encrypted in a homomorphic encryption with a first public key and a first square-value polynomial in which a plurality of bits included in square-value vector data of each component of the numerically vectorized first text data are set to coefficients in the ascending order and which is encrypted with in the homomorphic encryption the first public key;
acquiring a second polynomial in which a plurality of bits included in a numerically vectorized second text data are set to coefficients in a descending order and which is encrypted in the homomorphic encryption with the first public key and a second square-value polynomial in which a plurality of bits included in square-value vector data of each component of the numerically vectorized second text data are set to coefficients in the descending order and which is encrypted in the homomorphic encryption with the first public key;
calculating a first auxiliary data item for aggregating the each coefficient of the each term of the first polynomial,
calculating a second auxiliary data item for aggregating the each coefficient of the each term of the first square-value polynomial, and
calculating an encryption norm distance between the numerically vectorized first text data and the numerically vectorized second text data by executing a pattern matching which determines whether the second text data is included in the first text data, using the first polynomial, while maintaining the encrypting, the first square-value polynomial, the second polynomial, the second square-value polynomial, the first auxiliary data item, and the second auxiliary data item.

6. The ciphertext processing method according to claim 5, wherein the process further comprises:
transmitting the encryption norm distance which is encrypted with the first public key to a terminal device with a first secret key corresponding to the first public key.

* * * * *